United States Patent

Krishna et al.

[11] Patent Number: 6,012,071
[45] Date of Patent: Jan. 4, 2000

[54] DISTRIBUTED ELECTRONIC PUBLISHING SYSTEM

[75] Inventors: B. C. Krishna, Chelmsford; Julie Melbin, Groton; Daniel E. Latham, Concord, all of Mass.

[73] Assignee: FutureTense, Inc., Acton, Mass.

[21] Appl. No.: 08/790,654

[22] Filed: Jan. 29, 1997

Related U.S. Application Data

[63] Continuation-in-part of application No. 08/593,653, Jan. 29, 1996, abandoned.

[51] Int. Cl.[7] .................................................. G06T 1/00
[52] U.S. Cl. ......................... 707/522; 707/513; 709/217
[58] Field of Search ................................. 707/517, 523, 707/515, 530, 522, 513, 542; 345/335; 709/203, 217–219

[56] References Cited

U.S. PATENT DOCUMENTS

| | | | |
|---|---|---|---|
| 4,970,665 | 11/1990 | Doi et al. | 707/523 |
| 5,058,035 | 10/1991 | Nagata et al. | 707/522 |
| 5,133,051 | 7/1992 | Handley | 707/517 |
| 5,144,555 | 9/1992 | Takadachi et al. | 707/517 |
| 5,355,472 | 10/1994 | Lewis | 395/600 |
| 5,390,354 | 2/1995 | De Heus et al. | 707/517 |
| 5,434,961 | 7/1995 | Horiuchi et al. | 707/517 |
| 5,438,512 | 8/1995 | Mantha et al. | 707/517 |
| 5,530,852 | 6/1996 | Meske, Jr. et al. | 395/600 |
| 5,546,517 | 8/1996 | Marks et al. | 395/145 |
| 5,557,722 | 9/1996 | DeRose et al. | 395/148 |
| 5,572,643 | 11/1996 | Judson | 395/793 |
| 5,623,656 | 4/1997 | Lyons | 395/610 |
| 5,638,504 | 6/1997 | Scott et al. | 707/530 |
| 5,680,619 | 10/1997 | Gudmundson et al. | 707/515 |

OTHER PUBLICATIONS

Simpson, Mastering Wordperfect 5.1 & 5.2 for Windows, p. 131, 145,480,1113,1143–1145, 1993.

"OPI—Open Prepress Interface Specification 1.3" Aldus Corporation, Seattle, WA; Sep. 22, 1993.

"TrueDoc Font Technology Overview for New Media" Bitstream Inc., Cambridge, MA; May 1996.

Mitchell, J., "Font Fidelity in Portable Documents" *Color Publishing;* Jan./Feb. 1995.

*Primary Examiner*—Jospeh H. Feild
*Attorney, Agent, or Firm*—Hamilton, Brook, Smith & Reynolds, P.C.

[57] ABSTRACT

A design and layout tool defines regions within an electronic publication and provides instructions to a viewer for obtaining and formatting information to be displayed by the viewer within each region. The viewer may execute on a client computer system connected to a computer network. The viewer obtains information, pursuant to the instructions, from one or more server computer systems that are also connected to the computer network and displays the information to a user. The viewer is also responsive to user interactions and timer events to obtain and display the information. The design and layout tool may also generate secure font file names for the fonts associated with the information to be displayed by the viewer.

23 Claims, 3 Drawing Sheets

DISTRIBUTED ELECTRONIC PUBLISHING SYSTEM

CROSS REFERENCE

This invention is a continuation-in-part of U.S. patent application Ser. No. 08/593,653 filed Jan. 29, 1996 now abandoned.

BACKGROUND OF THE INVENTION

1. Field of the Invention

The invention relates to computer networks and, more particularly, to electronic publishing systems that employ servers to store electronic publications and browsers, executing on clients and communicating with the servers over the networks, to view the electronic publications.

2. Description of the Related Art

Computer networks, such as the Internet and private corporate networks, enable users to retrieve information from a wide variety of sources. They also enable publishers, information providers, advertisers and other information sources to supply information to these users. "Servers" are computer systems that are connected to a network and that store and supply information. One type of server on the Internet is known as a "web server," which provides access to a web site. Each web site can make available one or more "web pages," which are formatted, tree-structured repositories of information, such as text, images, sounds, animations, and three-dimensional simulations. Many traditional publishers, such as newspapers and journals, as well as corporations, individuals and organizations (hereinafter collectively referred to as publishers) have established web pages. "Clients" are computer systems, each typically controlled by one user, that may be connected to a network and request information from the servers on the network. In particular, clients at various locations can view web pages by "downloading" replicas of the web pages from the servers on which these web pages are stored.

Publishers often expend a great deal of effort to make their web pages as visually attractive as possible and to brand them identifiably because these publishers typically project their corporate images and attempt to derive revenue through subscription, use fees, or advertising income from these pages. Publishers may also obtain direct public relations and communications benefits from their web pages. Since publishers often deliver sales, advertising, product support, and employee communication services through their web pages, the web page's visual appeal, brand identity, and navigational use are important. For example, some publishers establish web pages that provide useful services, such as information searching in order to attract users. These publishers may include advertising space on these web pages in which they advertise their products and services or the products and services of others.

To create a web page, publishers typically use a "text markup language," such as the Hypertext Markup Language (HTML). An HTML file may contain "elements" such as text, graphics, tables, buttons, etc., each identified by a "tag." Markup languages specify the layouts and contents of their web pages by encapsulating static content. That is, the content or information to be displayed on the web page is typically written into the file. Accordingly, in order to change the contents or appearance of a web page, the corresponding file must be edited or changed. Publishers must periodically recode their web pages to update the information contained therein and to maintain an interest level necessary to attract repeat users. Creating and updating web pages can be very expensive, especially where publishers employ professional designers to produce their web pages. Furthermore, a user wishing to see current information must repeatedly cause his or her client to download an entire web page to obtain the most current version of any content in the web page.

This lack of flexibility in text markup languages results in all web pages looking much the same. Most publishers, when creating web pages, would prefer to have the flexibility available in traditional printed publications, including control over typography (font, size, leading), color, columnarization and text flow around graphics. Fonts pose a particular problem for these publishers.

"Fonts" are used to control visual attributes of text portions of web pages and other documents. A font is a definition of the shapes of printable or viewable characters (typically upper and lower case alphabetic characters, numbers, punctuation and special characters, such as the asterisk or the pound sterling currency sign). Fonts are identified by their names, for example "Times New Roman" and "Garamond." A considerable amount of creative effort often goes into designing a font. Accordingly, font developers typically charge a fee to license their fonts to publishers and other users, who then use the fonts to create publications.

A computer, moreover, can only "render" (display or print) text in fonts that have been "installed" on the computer with the exception of images of full-text pages. If a computer is requested to render text in a font that is not installed, the computer "falls back" and selects an installed font to render the text. The font chosen by the computer as a fall-back, however, might look quite different from the requested font. Furthermore, the fall-back font might have larger or smaller characters, which may cause line breaks, page breaks and other visual aspects of the publication to be rendered differently than intended by the publisher.

A small number of common fonts are usually installed on client computers. Some users, moreover, purchase and install additional fonts. Publishers do not, however, have a priori knowledge of which additional fonts are installed on clients. As a result, publishers are often forced to limit themselves to the most commonly installed fonts to ensure that their publications are rendered as intended. As set forth above, one alternative is to transmit text having a unique font as an image file. Image files, however, are typically quite large and thus require substantial time to download. Rather than wait for a large file to download, users might move on to other web pages.

Publishers typically embed information within documents to identify which font(s) are to be used to display or print the document. More specifically, each section of text in a publication typically identifies which font is to be used to render the text in the section. Each publication, moreover, can use several fonts throughout the publication. Publishers use one of two methods to specify the fonts to be used to render their publications. In the first method, the names of the fonts are embedded in each publication. When the client attempts to display the publication, if the named fonts are not installed on the client, the client substitutes installed fonts ("falls-back"), and the user sees the web page differently than the publisher intended.

Using the second method, a copy of each font is embedded in each publication. Although the recipients are permitted to render the documents with these embedded fonts, they are not permitted to use the fonts to create other documents, unless they, too, are licensed to do so. The files that make up a font are rather large. As a result, this method unnecessarily increases the time taken to download the publication to a client and is completely unnecessary if the client already has one or more of the fonts installed. Furthermore, fonts contained in a document may be repeatedly downloaded creating additional delays.

A "browser" is a computer program that executes on a client to provide a user interface to information servers. Each source of information on a server is known as a "resource" and has an associated text string by which it can be referenced. The text string, known as a "uniform resource locator" (URL), specifies: a protocol to use to obtain the information, such as the Hypertext Transfer Protocol (HTTP); the name or numerical address of a server from which to obtain the information; and a "local information text string." The local information text string is passed to a protocol handler on the server, which then returns the information. The local information text string often specifies a file, i.e., it contains a directory and a file name, but it can also specify a search request to be performed on a database or text index. Thus, a user specifies a URL to a browser, and the browser then retrieves and displays information from the resource associated with the URL.

Most browsers are capable of displaying only a small number of file formats and must invoke so-called "helper applications" to display other file formats (e.g., audio and video). A user, moreover, must have previously installed these helper applications on his or her client computer. In addition, HTML and extensions of it typically allow only a limited set of user interactions with information retrieved by a browser. For example, a user can scroll through an entire web "page"—for a long document, the page may be many screens in length—and can also follow a hypertext link to an entirely different web page, perhaps part of the same web publication or part of an entirely different one. However, enabling a user to easily follow hypertext links poses problems for the user, as he or she may find it difficult to return to the page of original entry—often a summary or contents page—to continue the viewing process.

The cost of traditional publishing is increasing due to cost increases of paper, inventory and distribution. Accordingly, sources of information are under increasing pressure to target their editorial and advertising content more precisely. As a result, publishers often wish to track usage patterns and collect demographic data about users who access web pages. Each computer connected to a network has a unique network address, and some publishers keep track of the network address of each client that accesses their servers. A "gateway" is a computer system that interconnects two computer networks. Many users access the Internet through gateways, such as America On-Line, that dynamically assign network addresses. Thus, each time a user accesses a server though one of these gateways, the user might have a different network address.

It is therefore an object of the invention to provide a system for easily creating and displaying visually attractive electronic publications.

It is a further object to display an electronic publication on a client using fonts specified by the publisher, regardless of whether the specified fonts are installed on the client, and to download the fonts only if they are not installed on the client.

It is a further object to provide a rich set of possible user interactions with information retrieved and displayed by a browser, including an ability to retrieve information from other servers while maintaining control over a view presented to a user.

It is a yet further object to enable the publisher to uniquely identify clients that access servers through a gateway.

Other objects will, in part, be obvious and will, in part, appear hereinafter.

SUMMARY OF THE INVENTION

Briefly, the invention relates to a distributed electronic publishing system comprising a design and layout tool for use in defining electronic publications and a viewer for use in displaying such publications on a graphical user interface ("GUI"). Using the design and layout tool, a page designer first establishes a plurality of regions within the electronic publication. The designer then defines a set of instructions for obtaining and formatting information (e.g., text, images, audio and/or video) to be displayed in each region. The designer may also provide instructions on how to respond to user interactions (e.g., a mouse click) with the region. In addition, the design and layout tool allows the designer to associate one or more timers with each region and define a corresponding set of instructions to be performed upon expiration of each timer. Once defined, the publication is preferably stored as a publication file at a server accessible by users via a computer network. The viewer, in response to a request by a user, accesses and downloads the publication file. The viewer, which may be implemented in the context of a browser application, then executes the instructions provided within each region. That is, the viewer locates and obtains the information defined within each region and arranges that information for display on the GUI as directed by the formatting instructions contained within the corresponding region. The viewer also executes any instructions regarding either user interactions or timers associated with the regions of the displayed publication.

By utilizing the design and layout tool, a publisher is able to separate a publication's content from its format (e.g., size, position, font, resolution, background color, interrelationship of regions, etc.). That is, rather than enter the actual contents as well as the corresponding format into the publication file, the page designer may simply define a set of instructions to access an information file or files and display the contents thereof in a given region. Moreover, by simply updating the associated information file(s), which may be located remotely from the server at which the publication file is stored, the corresponding information displayed is updated. Thus, the publisher need not edit the publication file every time the information in one region needs to be updated or changed.

In addition, a page designer may specify a list of sources for each region of a publication, in which case the viewer cycles through, or selects from, the list according to rules specified by the page designer. For example, a page designer may specify several sources of weather forecast information, e.g., NOAA, a regional airport, and a local radio or television source, and instruct the viewer to display information from each of these sources for several minutes in turn. In addition, the page designer can specify other time-based behaviors, such as updating a region from a single source, or scrolling or panning the information displayed in the region. Furthermore, the page designer can specify a "path" of resources for each source of information. In this case, the viewer attempts to obtain the information from each resource along the path. For example, the viewer may start with the resource that is closest to the client and, thereafter, move progressively to more distant resources until the viewer succeeds in obtaining the information. Such a path can be used to obtain information that might be available locally on a client, on a local network to which the client is attached, or on a global network to which the client has access.

The source of information, moreover, may depend on a variety of parameters, such as a user's geographic location, preferences, context within a publication or usage patterns. For example, by utilizing the design and layout tool, a page designer can specify rules for obtaining weather forecast information from a source that is geographically proximate to the user. Similarly, the viewer can be instructed to select advertisements based either on the type of information being displayed in surrounding regions of the publication or on the user's response to previously displayed advertisements. For example, if a region is not scrolled-through or selected by the user (e.g., by mouse clicks), the region might not contain information that is of interest to the user. Accordingly, the viewer can be instructed to obtain information from a different source to display in that region.

Furthermore, by utilizing the design and layout tool, a page designer may create a publication whose content, although accessible by the ultimate users, is not accessible to the page designer. More specifically, many private networks are connected to the Internet by a secure "firewall" that limits access from the Internet to the private network but allows access from the private network to the Internet. A page designer can design a publication that causes the viewer to obtain and display information that is accessible to a user even though the page designer does not have access to the information. Instead, the page designer only needs the address of this information. For example, a page designer may design a corporate newsletter to display private corporate information that the viewer obtains from the private network to which the client is connected. The page designer can then make the publication file available on the Internet and the same publication file can be accessed by clients that are connected to different private networks. Each such client displays different information, i.e., information obtained from the client's respective private network, but according to the same formatting and other rules specified by the page designer.

The information source or sources that are accessed in order to display information in a given region may also depend on user responses and interactions with displayed information. For example, the viewer can obtain a low-resolution version of an image from a first resource. In response to a user selecting the image, e.g., via a mouse click, the viewer may be instructed to obtain a high-resolution version of the image from a second resource. If the user again selects the image, the viewer may obtain and display a third animated version of the image. In another example, using a "rubber-band" cursor, when a user selects an area of interest in a weather map, the viewer obtains and displays a detailed weather radar image of the selected area or text of a weather forecast that corresponds to the selected area.

The viewer may also display the publication using fonts specified by the page designer, regardless of whether these fonts are installed on the client computer and without necessarily requiring the viewer to download all of the required fonts. In particular, the design and layout tool allows the page designer to specify the fonts that are to be used to render the page or portions thereof. The design and layout tool then stores each font in a separate file and uses an encryption algorithm to generate an incognito name for each file. Unscrupulous, unlicensed users do not know under what name a given font is stored and are thereby prevented from copying the font.

The "plain" (unencrypted) names of the fonts are stored in the publication file. When the viewer downloads the publication file, it ascertains if the named fonts are already installed on the client computer. If so, the viewer uses these installed fonts to display the publication. The publication file also stores the generated filenames of the fonts. If a required font is not installed on the client computer, the viewer uses the generated filename to download the font and render the publication. Significantly, the viewer may cache recently downloaded fonts and keep track of the generated names of the cached fonts. Thus, if a subsequent publication or the same publication at some later point requires one of the cached fonts, the viewer avoids the overhead associated with redundantly downloading the font.

When information obtained by the viewer is too voluminous to fit in a given region, the viewer preferably formats the information and/or the region according to rules specified by the page designer via the design and layout tool. For example, when more information is obtained than fits in the region, the viewer can scale down or clip the information, use a smaller typeface, or add scroll controls. Similarly, the viewer can scale up an image that is smaller than its designated region.

The viewer may also utilize "constraint-based" layout strategies to modify the size and shape of regions within constraints specified by the page designer via the design and layout tool. These constraints, moreover, may involve several regions. For example, a first region may be constrained to be top-aligned with a second region. When the viewer modifies the size or position of the second region, it may also modify the size or position of the first region. The viewer may also employ other unique constraints, such as color- and typography-related constraints. For example, a page designer utilizing the design and layout tool can specify that a set of regions all be displayed using the same leading and indentation or using related sets of fonts, e.g., display text in Region A using Times Roman when text in Region B is displayed using Courier, but display text in Region A using Arial when text in Region B is displayed using Garamond. Furthermore, the page designer can specify that the regions be displayed with complementary or contrasting color backgrounds.

By virtue of the design and layout tool and the viewer, a page designer may also allow a user to personalize a publication by giving the user control over some or all aspects, e.g., typography, of the publication. For example, the user may control the content of a region by selecting from a set of predefined sources from which the viewer obtains information to display in the region. Alternatively, the user may be permitted to resize a region within certain constraints or possibly eliminate a given region entirely from the publication. As described above, re-sizing a given region may cause the viewer to resize other regions. Accordingly, a user may decrease the amount of weather information displayed by a publication and, thereby, increase the amount of news information displayed.

Each viewer may also be provided with a unique identity code. Using this code, the view may then identify itself to a server, thus enabling the server to collect demographic data. The viewer may also collect additional data, such as cursor movements, the amount of time a given information unit is displayed, or the percent of a displayed information unit through which the user scrolled. The viewer may send a copy of this collected data to the server. Furthermore, once a user has registered with a server, the viewer can use the unique identity code to identify itself to the server during subsequent interactions with the server, thereby obviating a need for the user to re-register each time it accesses the server.

BRIEF DESCRIPTION OF THE DRAWINGS

Further features and advantages of the present invention as well as the structure and operation of various embodiments of the present invention are described in detail below with reference to the accompanying drawings. In the drawings, the left-most digit of each reference number identifies the drawing in which the reference number first appears and like references indicate similar elements.

DESCRIPTION OF THE PREFERRED EMBODIMENT

Figure 1:
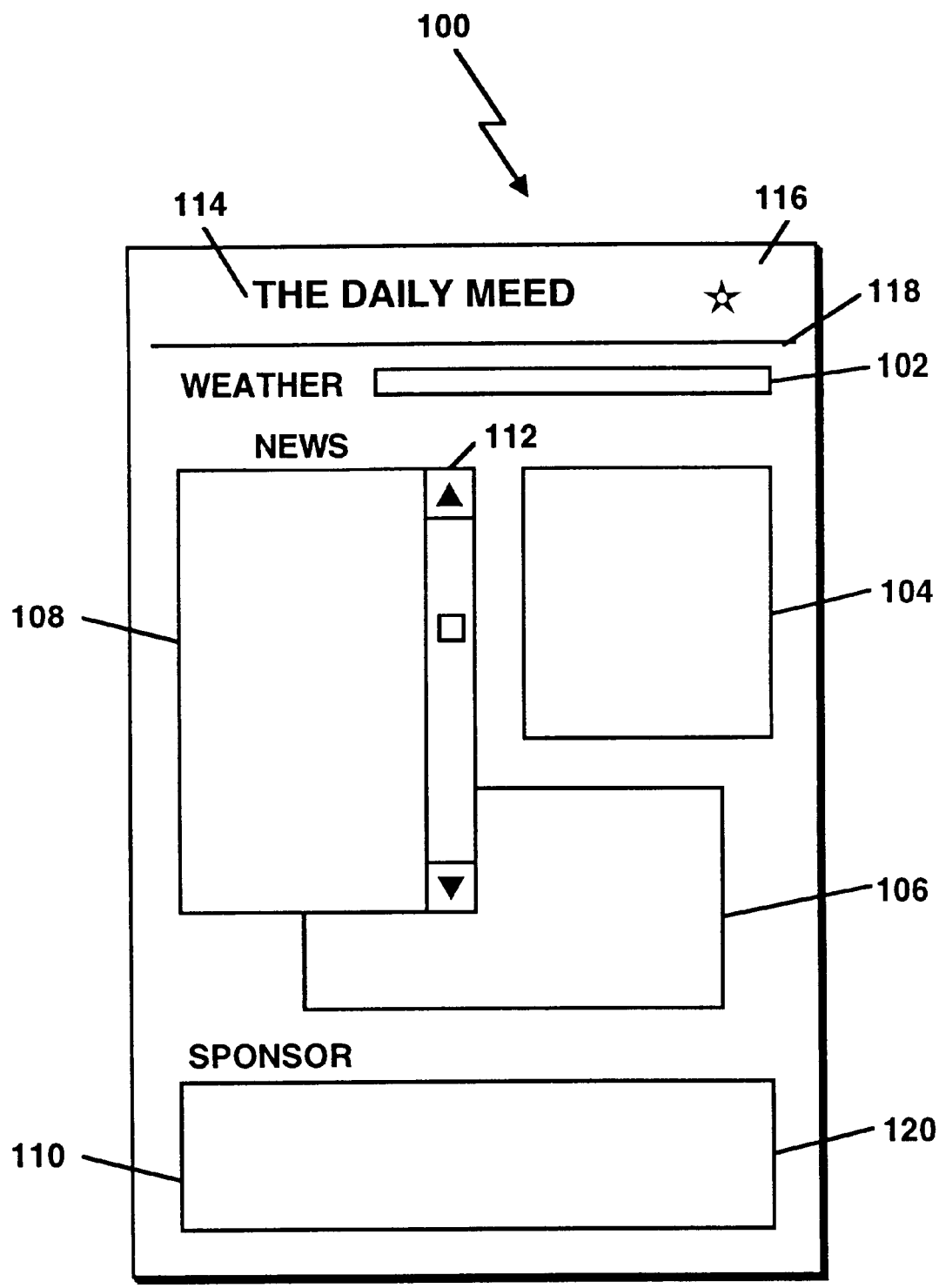
FIG. 1 is a schematic drawing of an electronic publication produced by the present invention.
Figure 2:
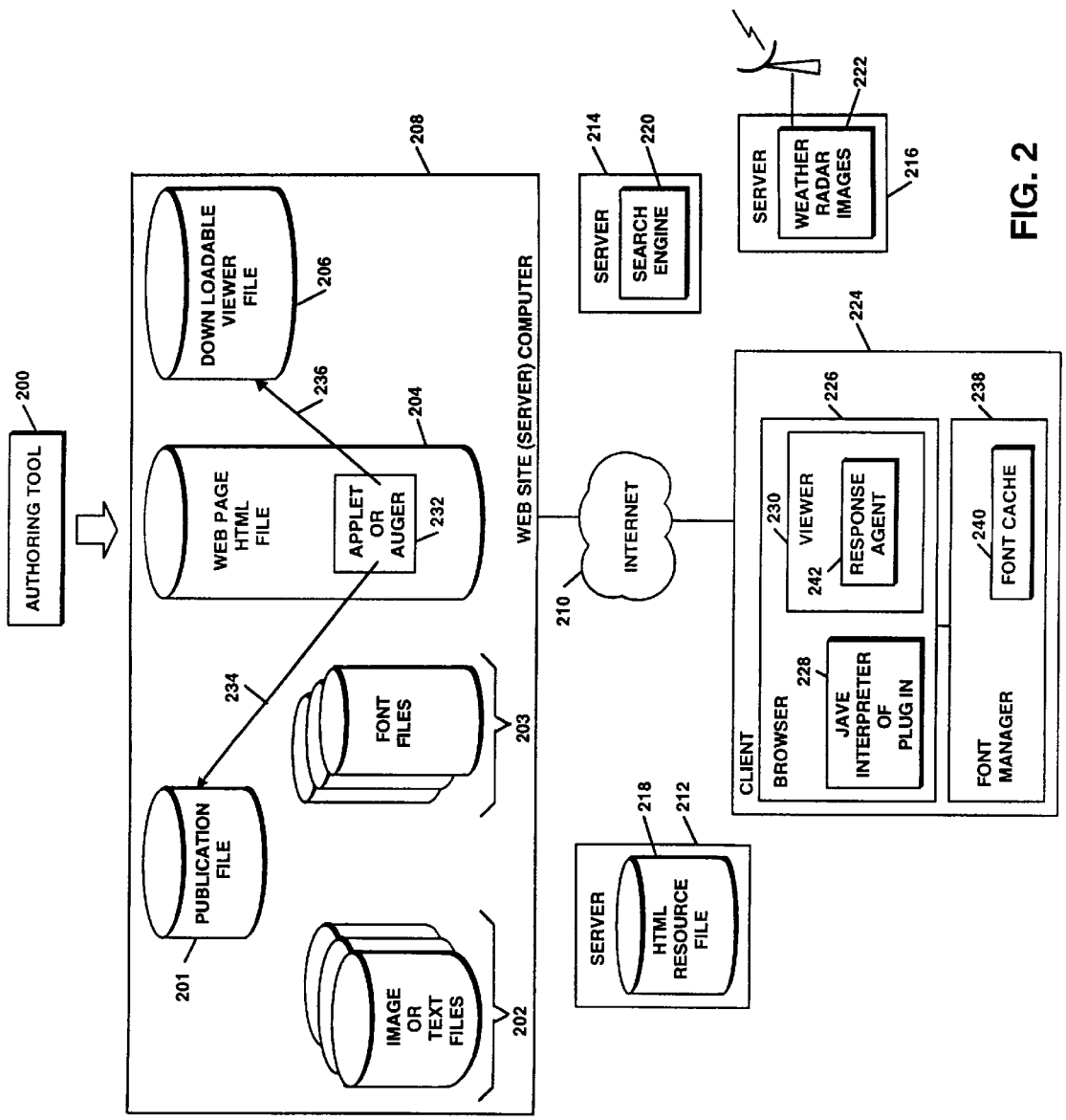
FIG. 2 is a block diagram of a design and layout tool and a viewer according to the present invention.

FIG. 1 illustrates an exemplary electronic publication 100 that may be produced by a design and layout tool and displayed by a viewer according to the present invention. FIG. 2. illustrates a procedure and data flow by which a design and layout tool ("Tool") 200 produces an electronic publication, represented by a publication file 201, image and/or text files 202, font files 203, a web page HTML file 204 and a downloadable viewer file 206. The downloadable viewer file 206 may be a Java applet. These files are stored on a web site computer system 208, which is connected to a local or global computer network, such as the Internet 210. Other servers 212, 214 and 216 are also connected to the network 210 and each server 212, 214 and 216 preferably contains at least one resource. For example, server 212 contains an HTML resource file 218; server 214 contains a search engine 220; and server 216 contains a resource 222 that can return weather radar images. A client computer system 224 is preferably connected to the network 210. The client computer 224 may execute a browser application 226 that contains a Java interpreter or plug-in 228. The Java interpreter 228, in turn, executes a viewer 230.

Returning to FIG. 1, a page designer utilizes the Tool 200 (FIG. 2) in order to define a layout for the electronic publication 100. More specifically, the page designer using the Tool 200 defines one or more regions, such as regions 102, 104, 106, 108 and 110. In the preferred embodiment, these regions 102, 104, 106,108 and 110 are rectangular. It should be understood, however, that the regions created by the Tool 200 may have other shapes. The Tool 200 preferably provides a "drag-and-drop" user interface (not shown). The drag-and-drop user interface allows the page designer to select types of regions from a palette and to drag these types and position them on a work area. The page designer may rearrange and resize the regions 102 to 110. This type of user interface is well-known in the art and will not be described in more detail.

The type of region that the page designer selects from the palette may correspond to the type of information (e.g., text, image, graphic, animation, timer, or link) that will be displayed in the region by the viewer 230. Using the Tool 200, the page designer may add controls to the electronic publication 100, such as a scroll control 112. The page designer may also add fixed text and graphics such as text 114, graphic 116 and rule 118. These fixed texts and graphics are preferably stored in the image and text files 202, which may be stored in subdirectories of the directory in which the web page HTML file 204 is stored.

The Tool 200 may also provide a so-called "property-sheet" user interface (not shown), by which a page designer can specify characteristics of each region. A property-sheet user interface allows the page designer to select a region, e.g., via a double mouse-click, after which the user interface displays an editable list of characteristics of the selected region. This type of user interface is also well-known in the art and will not be described in more detail. The characteristics of each region may include the region's size, resolution, font, text flow from column to column in a multicolumn publication, leading, indentation, background color and special treatment. Special treatment may include such characteristics as a drop shadow 120 applied to region 110 and layering, as illustrated by region 108 overlapping region 106. For each region 102 to 110, the page designer also preferably specifies a source or a list of sources and rules for selecting or cycling among the sources to be displayed in the corresponding region 102 to 110. Each source is preferably identified by a URL.

When the page designer has completed defining the electronic publication 100, the Tool 200 preferably stores, in the publication file 201, a description of the layout of the publication including instructions for obtaining and formatting each of the regions. It should be understood that the Tool 200 may encrypt the contents of the publication file 201. The Tool 200 also produces the web page HTML file 204, which contains an applet tag or plug-in 232. The applet tag or plug-in 232 preferably contains a URL 234 of the publication file 201 and a URL 236 of the downloadable viewer file 206. The publication file 201 and the downloadable viewer file 206 are preferably stored in subdirectories of the directory that stores the web page HTML file 204.

It should be understood, however, that these files need not be stored on the same server.

The Tool 200 also stores each required font in a separate font file 203. These font files 203 are preferably stored in subdirectories of the directory in which the web page HTML file 204 is stored. The subdirectory structure, moreover, is preferably consistent from publication to publication, so that once the location (e.g., URL) of the web page HTML file 204 is made known to the viewer 230, the viewer 230 can locate the other files by using "relative" URL addressing. The Tool 200 may generate an incognito or secure name for each font file 203 by applying an encryption algorithm to the plain name of the font. The Tool 200 then stores the plain font names and the generated secure names (but not the subdirectory names) in the publication file 201.

When a user requests the browser 226 to display the publication represented by the web page HTML file 204, the user specifies the URL of the HTML file 204 (either explicitly, or implicitly by following a "link") and the browser 226 downloads the web page HTML file 204. The browser 226 also ascertains that the file contains the applet tag or plug-in 232. The browser 226 then uses the applet tag or plug-in 232 to locate and download the downloadable viewer file 206, unless a suitable viewer (not shown) has been previously installed on the client 224. In either case the Java interpreter 228 in the browser 226 interprets instructions in the downloaded or previously-installed viewer file 206. Next, the viewer 230 downloads the publication file 201 and uses the URLs contained therein to obtain contents, e.g., from servers 212, 214 and 216, and to format and display the contents to the user according to the instructions stored in the publication file 201.

A user may view multiple publications, each in a separate window of the browser 226. In this case, a separate viewer 230 may execute for each window that displays an electronic publication produced according to the invention, thereby producing a "browser-within-a-browser" effect.

Figure 3:
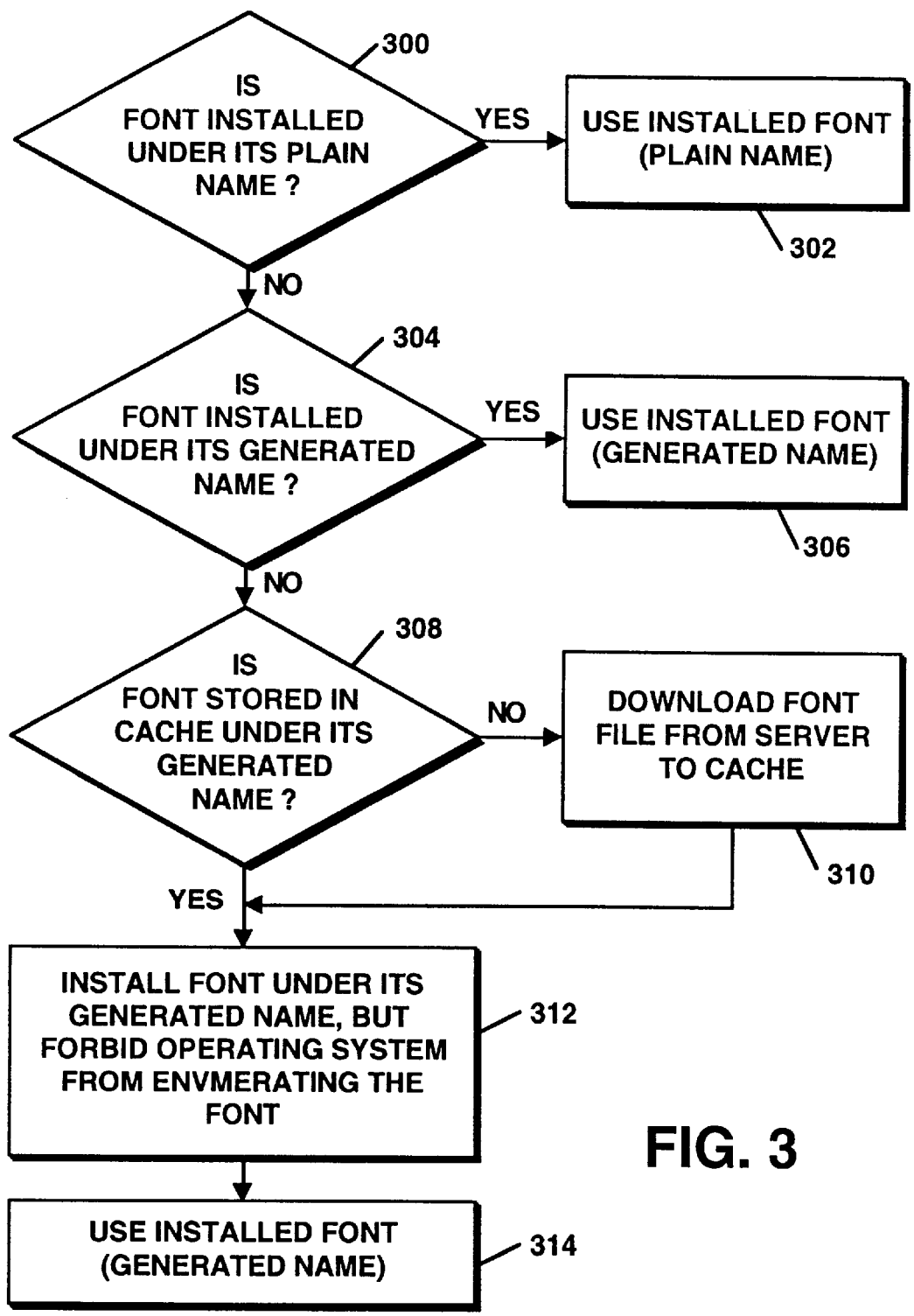
FIG. 3 is a flow chart that depicts steps taken by the viewer to render text using a font specified by a publisher.

For each font specified in the publication file 201, the viewer 230 preferably ascertains whether the font is installed on the client computer 224. If not, the viewer 230 causes the appropriate font file 203 to be downloaded to the client. This process is illustrated in the flow chart of FIG. 3. Preferably, the client 224 executes a "font manager" 238, which includes a font cache 240. The font manager 238 can be part of an operating system (not shown) or, alternatively, the font manager 238 can be part of the viewer 230.

For each font specified in the publication file 201, at step 300, the viewer 230 interrogates the font manager 238 as to whether the font is installed under its plain name on the client 224. If so, as shown by step 302, the viewer 230 uses a well-known method to request that the associated text be rendered using the specified font. If the font is not installed under its ordinary name, the viewer 230, as shown at step 304, interrogates the font manager 238 as to whether the font is installed under its generated secure name on the client computer 224. If so, at step 306, the viewer 230 uses a well-known method to request that the associated text be rendered using the specified font.

If the font is not installed under either its plain or generated secure name, at step 308, the font manager 238 checks whether the font is stored under its generated secure name in the font cache 240. If not, the font manager 238 prepares to download the appropriate font file 203. More specifically, the URL of the web page HTML file 204 has been previously specified to the browser 226 by the user. Since the font files 203 are preferably stored in a consistent subdirectory of the directory in which the web page HTML file 204 is stored and the publication file 201 stores the generated secure name of the appropriate font file, the font manager 238 can construct the URL of the appropriate font file. Accordingly, at step 310, the font manager 238 preferably constructs the corresponding URL and downloads the font file 203 from the server 208 to the font cache 240.

At step 312, the font manager 238 preferably installs the font under its generated secure name and instructs the operating system not to "enumerate" the font. Consequently, if an application program (not shown) requests from the operating system a list of installed fonts, the font installed by the font manger 238 is not listed. This "hides" the font from application programs that do not have access to the generated secure name and thus prevents unlicensed use of the font to produce other publications. However, since the viewer 230 has access to the generated secure name of the font, at step 314, the viewer 230 requests that the text associated with the text file 202 be rendered using the font. When the viewer 230 is subsequently closed or terminated or when the client 224 is shut down, the hidden fonts are preferably deinstalled.

If the Tool 200 is subsequently utilized to create another electronic publication (not shown) that uses one or more of the fonts used in the above-described publication, the Tool 200 preferably generates the same font name as described above. Then, when the viewer 230 interrogates the font manager 238, the font is found under its generated secure name and need not be redundantly downloaded.

Returning to FIGS. 1 and 2, the viewer 230 preferably executes a separate "thread" (not shown) for each region 102-110. The thread follows instructions in the publication file 201, e.g., obtain, format and display information in a corresponding region, respond to user interactions and respond to timer events. The page designer can also define "agents" that do not correspond to regions, but for which the viewer 230 nevertheless executes threads. For example, a response agent 242 can collect user response and interaction data and send this data to a server, e.g., server 212, 214 or 216, from which the viewer 230 has obtained information to display in a region.

A user may choose to install a viewer on his or her client computer 224 to avoid a performance penalty associated with downloading the downloadable viewer file 206 each time the user accesses an electronic publication according to the invention. A previously installed viewer, moreover, has access to local disk storage on the client computer 224, whereas a downloaded Java applet, such as the downloadable viewer 206, does not. Thus, a previously installed viewer can cache to disk downloaded fonts and can then use the cached fonts during subsequent executions. Furthermore, such a viewer can collect user response and interaction data over several executions and can thus send more statistically meaningful data to a server.

Preferably, whenever a user installs a viewer, the viewer ascertains a time of installation, stores this time and henceforth uses this time as an identifier of the viewer. The viewer can then send this identifier to servers. Since the viewer can ascertain the time of installation to within milliseconds and it is unlikely that two users will have installed their viewers within milliseconds of each other, the time is very likely to uniquely identify the respective viewers. Optionally, the downloadable viewer 206 can also be given a similar identifier.

It should be understood that although the viewer 230 has been described as executing within a browser, the viewer 230 can optionally be a stand-alone program.

It should also be understood that the exemplary computer network 210 used for interconnecting the viewer 230, the electronic publication 100, and sources of information to be displayed within the publication 100 may comprise private computer networks or the Internet.

It will therefore be seen that we have developed a design and layout tool for use in defining an electronic publication and a viewer for use in viewing the electronic publication that can be utilized with a variety of computer networks.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A distributed system for displaying an electronic publication, the system comprising a first computer called a client, a second computer called a server, and a computer network interconnecting the client and the server, wherein:

(a) the server stores a publication outline file, the publication outline file defining a layout of the electronic publication such that the electronic publication contains at least one region, and for each region, the publication outline file containing formatting instructions for how to format information displayed within each region, the formatting instructions including at least a name of a font file containing fonts to be used in displaying text content information within the corresponding region, as well as locating instructions for how to locate content information for each respective region, the content information being stored in a file separately from the formatting instructions in a content file different from the publication outline file, and upon request from the client, the server sends the publication outline file to the client; and (b) the client executes an application program to obtain the publication outline file, and for at least one region defined therein, to obtain the content information by following the respective locating instructions to locate the content file to obtain the content information stored therein, and to determine whether a specified font file by the formatting instructions is already stored locally at the client, and if not, to download the specified font file to the client and using the specified font file in a manner such that if another program requests a list of installed fonts the specified font file appears to not be installed at the client, to format the content information according to the respective formatting instructions, including formatting text content information using the specified font file, and then to display the formatted content information at the client.

2. A system as in claim 1 wherein the specified font file is installed under a generated secure name.

3. A system as in claim 2 wherein when the application program obtains instructions for a second publication outline file containing formatting instructions which specify a specified font file already downloaded to the client, using the generated secure name to locate the specified font file.

4. A system as in claim 1 wherein the specified font file is not allowed to be enumerated by the operating system.

5. A system as in claim 1 wherein the publication outline is provided as a set of tags within a Hypertext Markup Language (HTML) file.

6. A system as in claim 1 wherein the application program executes as a viewer program within a browser program executing at the client.

7. A system as in claim 1 wherein the locating instructions include a Uniform Resource Locator (URL) of a content file located at a third computer that is located remotely from both the server and the client.

8. A system as in claim 7 wherein the locating instructions specify a list of content file URLs, and wherein the client computer selects one of the URLs in response to the formatting instructions.

9. A process as in claim 7 wherein the locating instructions specify a list of content file URLs for a given region of the electronic publication and the client computer selects a content file from the list of content URLs in response to timer events.

10. A system as in claim 8 wherein the formatting instructions specify that the client is to select a content file by checking the list of content file URLs in a predefined order until an available content file is located.

11. A system as in claim 10 wherein the list of URLs includes files located at the client computer, files located within a local network to which the client computer is connected, and files located in a remote network.

12. A system as in claim 8 wherein the client computer selects one content file from the list of content files using at least one criteria selected from the group consisting of user geographic location, user preferences, publication contact, or publication usage patterns.

13. A system as in claim 1 wherein the publication outline defines a layout for the publication such that the publication contains a plurality of regions, and the publication outline also contains locating instructions including unique content file URLs for different regions in the publication.

14. A system as in claim 1 wherein the network comprises local networks interconnected by an Internet, the publication outline file is stored as a file in a network server connected to the Internet, and the locating instructions include a Uniform Resource Locator (URL) specifying the location of content file located within servers connected to the local networks such that the display of a given publication outline results in two different displays for client computers connected to two different local networks.

15. A method for displaying an electronic publication in a distributed computing environment comprising the steps of:

at a server computer,
(a) storing a Hypertext Markup Language (HTML) page file, the HTML page file containing an applet tag, the applet tag including a first Uniform Resource Locator (URL) for a viewer program file, and a second URL for a publication file containing formatting instructions for at least one region in the electronic publication, and the publication file itself containing at least a third URL for a content file containing content information for the at least one region;
(b) providing the HTML page file to a client upon request by that client;

at a client computer,
(c) requesting the server computer to download the HTML page file;
(d) reading the applet tag contained in the HTML page file to determine the location of the viewer program file and then downloading the viewer program file as needed; and
(e) executing the viewer program file to perform the steps of
(i) downloading the publication file specified by the second URL;
(ii) obtaining content information by downloading the content file specified by the third URL; and
(iii) formatting and displaying the content information so obtained from the content file according to the formatting instructions obtained from the publication file.

16. A method as in claim 15 wherein the step (e) of executing the viewer program additionally comprises the step of:

(iv) determining if a font file specified by the publication file is stored at the client computer, and if not,
(v) downloading the specified font file to the client computer in a manner such that if another program running on the client computer requests a list of installed fonts, the specified font file appears to not be installed at the client computer.

17. A method as in claim 16 additionally comprising the step of:

(vi) installing the specified font file under a generated secure name.

18. A method as in claim 16 additionally comprising the step of:

(vii) not allowing the operating system to enumerate the specified font file.

19. A method as in claim 17 additionally comprising the steps of:

(viii) downloading a second publication file specified by a fourth URL containing formatting instructions which also specify the specified font file already downloaded to the client computer in step (iv); and (ix) using the generated secure name to locate the specified font file.

20. A method as in claim 16 wherein:

step (a) further comprises storing a second URL for a publication file that contains a list of a plurality of content file URLs; and step (e) further comprises selecting one of the content file URLs from the list of content file URLs in response to the formatting instructions obtained from the publication file.

21. A method as in claim 20 wherein the formatting instructions specify that the client computer is to select a content file by checking the list of content file URLs in a predefined order until an available content file is located.

22. A method as in claim 20 wherein the list of URL's includes content files located at the client computer, files located within a local network to which the client computer is connected, and files located in a remote network.

23. A method as in claim 20 wherein the client computer selects one content file from the list of content files using at least one criteria selected from the group consisting of user geographic location, user preferences, publication contact, or publication usage patterns.

* * * * *